United States Patent [19]

Fallova, Jr.

[11] Patent Number: 4,729,673

[45] Date of Patent: Mar. 8, 1988

[54] ADD-ON BEARING PROTECTOR

[75] Inventor: Louis Fallova, Jr., Amsterdam, N.Y.

[73] Assignee: Fallova Shredder Co., Inc., Cohoes, N.Y.

[21] Appl. No.: 867,935

[22] Filed: May 29, 1986

[51] Int. Cl.⁴ .......................... F16C 33/74; F16J 15/16
[52] U.S. Cl. .................................. 384/139; 384/149; 277/112
[58] Field of Search ............... 384/130, 139, 149, 150, 384/152; 277/110–112, 85

[56] References Cited

U.S. PATENT DOCUMENTS

| | | | |
|---|---|---|---|
| 1,879,774 | 9/1932 | Temple | 384/149 |
| 2,023,898 | 12/1935 | Olson | 384/139 |
| 2,806,748 | 9/1957 | Krotz et al. | 384/149 |
| 3,441,324 | 4/1969 | Libby | 384/130 |
| 3,502,375 | 3/1970 | Whittum | 384/139 |

FOREIGN PATENT DOCUMENTS 1134677  4/1957  France ................. 384/477

*Primary Examiner*—Stuart S. Levy
*Assistant Examiner*—Thomas R. Hannon
*Attorney, Agent, or Firm*—Schmeiser, Morelle & Watts

[57] ABSTRACT

A bearing protector apparatus inserted on a rotating shaft between a machine housing and its original bearing assembly. The invention comprises a cylindrical body which is attachably bolted to the housing of the machine and, in turn, having attached to it the original bearing assembly. Internal and integral with the bearing protector apparatus are a flange and a compression plug for, retention-of-compression, thus assuring proper use of packing materials therewith.

2 Claims, 2 Drawing Figures

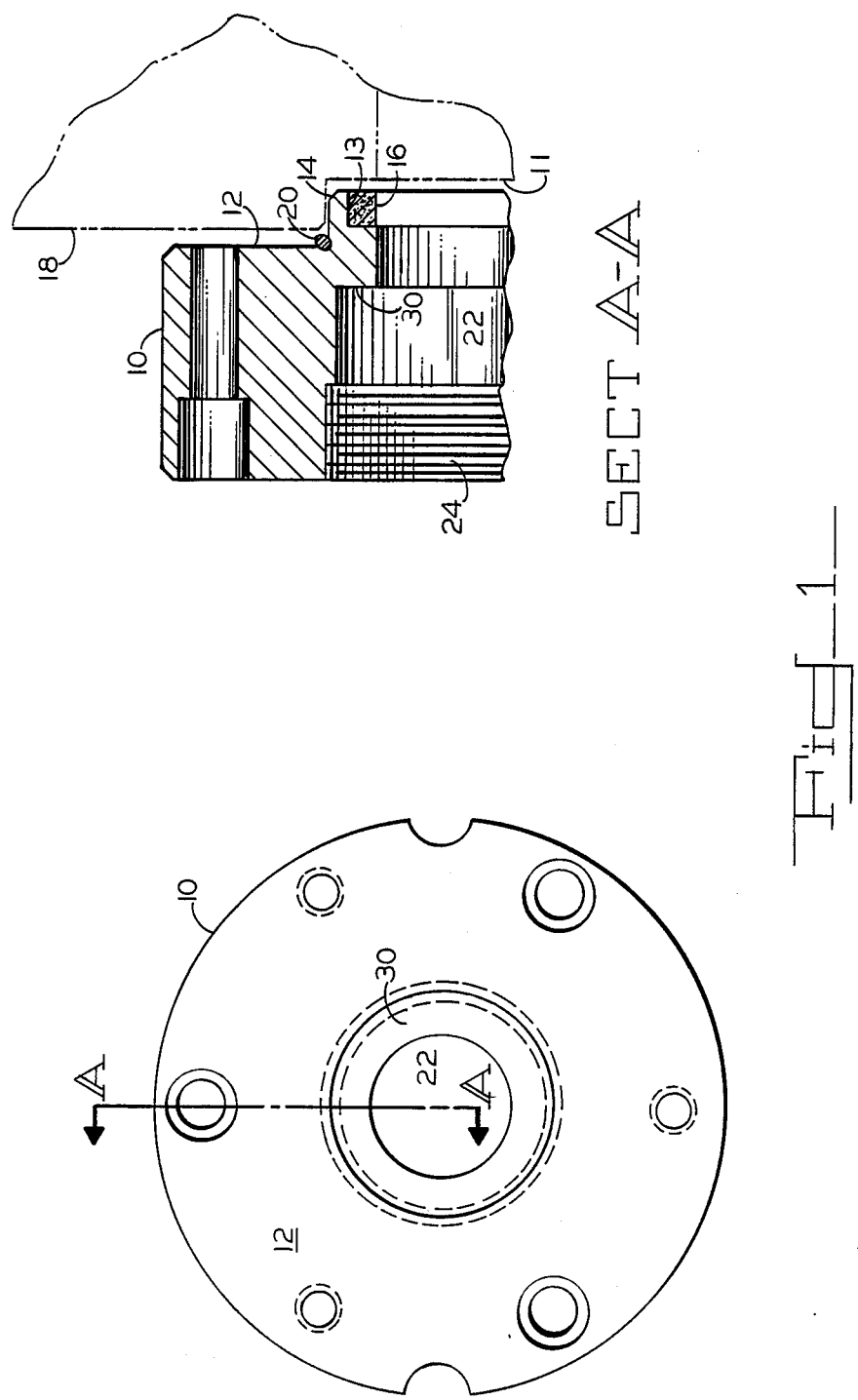

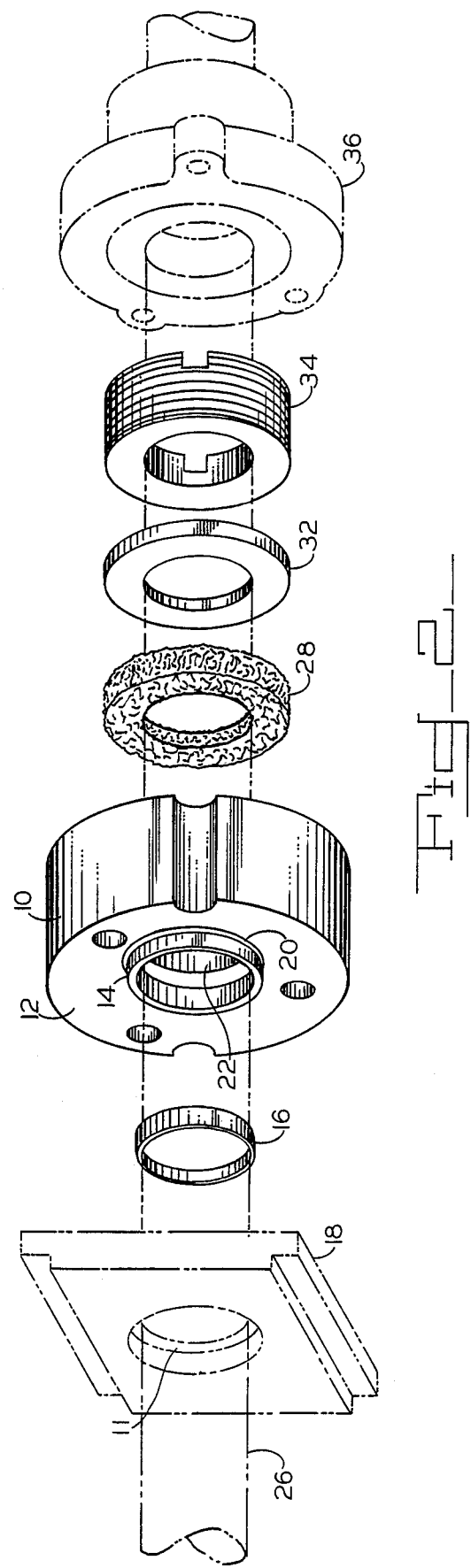

ADD-ON BEARING PROTECTOR

FIELD OF THE INVENTION

The present invention relates generally to means employed for protecting machine bearings for the extension of the useful life of said bearings, and more particularly, to add-on bearing protectors which may be adapted to or fitted to existent machines.

BACKGROUND AND OBJECTS OF THE INVENTION

Practically all rotating machinery requires the use of bearings to support rotating shafts or rotors. Oftentimes, the operating life of a piece of rotating machinery is no longer than the operating life of the bearings which support or receive the thrust from main shafts, crank shafts, etc. Many factors contribute to the degradation of, and the shortening of the lift of the bearings, not the least of which are corrosion by machine-processed fluids and abrasive particulate matter.

The aforementioned problems of corrosion and abrasive wear on bearings is most noticeable in machinery employed for solid waste comminution. Comminution is the reduction of particle size of solid waste and is generally performed by shredding, crushing or pulverizing such type of material. The action of a modern comminutor is well described in a patent issued to Chambers, U.S. Pat. No. 4,046,324, dated Sept. 6, 1977, for a SOLID WASTE COMMINUTOR. Therein, Chambers describes and offers a typical apparatus for processing solid waste by communution.

Inherent in the use of any machine which works with a medium of very small particulate matter will be the problem of accelerated bearing wear. For example, in addition to the excessive bearing wear found in comminutors, is that found in cement or gravel mixers, fertilizer and resin agitators and the like. As mentioned above, the operational life of these types of machines may be no longer than the operational life of their bearings. It has also been noted, in the case of this type of machine, that although manufacturers have attempted to extend the life of the bearings, through the use of integral protection systems, such attempts have been frustrated not by the particulate size of abrasives, but rather by the combination of abrasives, and especially in the case of solid waste comminutors, the corrosive liquid waste materials which are being processed.

A comminutor, of the type described above, suffers regular break-down primarily because of the interaction of the bearing material with machine-processed liquids, which have a pH ranging between 4 and 5, and often lower. Such chemical corrosion generally begins the process of bearing destruction which is finally completed by abrasion caused by grit and sand inclusion in the sludge-like processed material. Owing to the origin of such abrasive particulates, due primarily to street run-off, laundry effluent, cleansers used in kitchens/cafeterias, etc., it is readily apparent that comminutor operators will have to live with the problem rather than eliminate it before it enters the waste processing phase. Since the basic problem, that is, the propensity for short operational bearing life in such machines, is a chronic one, it is necessary to extend bearing life by some other means.

It is therefore an object of this invention to develop means for prolonging the operational life of bearings which are used in the construction of the aforementioned rotating machinery.

It is also an object of this invention to provide means which will ensure greater seal integrity, thus eliminating leakage and contamination from and by solid waste comminutors.

It is a further object of this invention to provide bearing protector means of a type readily adaptable to the several types of rotating machinery.

It is yet another object of this invention to provide bearing protector means which can be readily and economically fabricated as well as replaced in conjunction with regular preventive maintenance programs.

Finally, it is an object of this invention to provide non-integral machine bearing protective means which do not require a high degree of construction precision.

The objects and advantages of the invention are set forth in part and may also be learned by practice with the invention; the same being readily recognized through the disclosure herein made by those familiar with the art.

SUMMARY OF THE INVENTION

It has been found that the objects of this invention may be realized by the construction of bearing protector apparatus which is attached coaxially at the bearing end of a machine shaft, affixing to the machine housing and, in turn having fixed thereto and also coaxially with said shaft, a bearing assembly. The bearing protector assembly comprises an essentially cylindrical protector body which is flanged on the machine-facing side to receive a seal which is interposed between it and said housing, said protector body having interior means for receiving packing materials and an inner shim as well as threading to receive a packing nut or compression plug which presses against said inner shim, thereby compressing said packing about the rotating shaft.

In normal operation, the standard bearing assembly is removed from the shaft of the rotating machine. The protector (cylinder) body bearing the machine-side seal is mounted to the machine housing over the shaft. Once secured, packing material is placed interior to the protector cylinder and backed by the inner shim. Thereafter, the packing nut is mounted over the shaft and screwed into the protector cylinder thus compressing the packing material and forming a liquid barrier. Finally, the standard bearing assembly is mounted onto the shaft end and affixed to the outside surface of the add-on bearing protector (specifically, the protector cylinder body).

It should be understood that the foregoing general description and the following detailed description as well, constitute a single preferred embodiment of the invention but are not to be considered as restrictive. Thus, effort has been made to disclose the minimum basic parts of the bearing protector assembly without reference to such matters as materials of construction. However, in fulfilling all of the objects of this invention, it must be noted that a wide range of materials may be employed. Essentially castable, machinable and non-deformable material or composition may be used in the formation of such components as the seal, the protector cylinder, inner shim, and compression (packing) nut. The inventor suggests the DuPont product currently in use and registered in the Patent and Trademark Office as TEFLON. It is also conceivable that polyvinychloride (PVC) could also be used.

The accompanying drawings, referred to hereinafter, illustrate a preferred embodiment of the invention.

BRIEF DESCRIPTION OF THE DRAWINGS

Of the drawings:

FIG. 1 is an orthographic, partial sectional illustration of the invention; and

FIG. 2 is a perspective drawing of the invention.

DESCRIPTION OF THE PREFERRED EMBODIMENT

Referring now more particularly to FIGS. 1 and 2 of the accompanying drawings, there is illustrated a conventional arrangement for the add-on bearing protector apparatus. Fig. 1 has been partially sectioned at A—A for the purposes of clarity.

In FIG. 1 and FIG. 2 reference is made to the protector cylinder 10; and the machine-side face 12 of said protector cylinder shall hereinafter be referred to as "front". On the front side of the protector cylinder, there is situated a grooved 13 annular flange 14; its purpose is to hold seal 16 between the protector cylinder 10 and the inner flanged surface 11 of the machine-housing 18 (FIG. 2). An O-ring seal 20 is mounted at the base of flange 14 to assure adequate sealing between the protector cylinder and the machine interior.

Chamber 22 passes through the protector cylinder and is threaded 24 for approximately one-third to one-half of its aft end. Once the bearing protector is affixed to housing 18 with shaft 26 protruding therethrough, packing 28 is pressed in and around the shaft and against flange 30. Inner shim 32 is then inserted behind the packing and packing nut 34 is threaded into protector cylinder 10 at threaded area 24. The bearing assembly, FIG. 2 phantom item 36, is then affixed to the aft surface of the bearing protector body.

Those having ordinary skill in this art will recognize the O-ring seal 20 is a mere expedient; the usual seal used in these circumstances being the pre-fitted or cut type normally placed between bearing mounting surfaces. That it is herein placed at the base of annular flange 14 is of no particular moment.

It will be apparent, most noticeably by the lack of appearance within industry today, that the add-on bearing protector serves as a highly versatile adjunct to any of the aforesaid rotating machines and, as has been experienced by the inventor, is capable of extending bearing life, particularly in comminutors, as much as 600%.

The invention in its broader aspects is not limited to the specific embodiment herein shown and described, but departures may be made from this generalized practice within the scope of the accompanying claims without departing from the principles of the invention.

What is claimed:

1. An add-on bearing protector apparatus to be inserted on a rotatable shaft between a housing an a bearing assembly of a machine comprising:

an essentially cylindrical body having front and back faces and a concentric chamber therethrough, said chamber having a grooved annular flange at the front face of said body and threading at its back end, said annular flange being integral with the front surface of said body and coaxial with said chamber and adapted to receive a seal within its interior rim and a gasket about its annular base;

an interior flange within said chamber for receiving packing material there against; and a compression plug of rigid construction for insertion into the back end of said chamber, whereby said packing material may be retained within said body completely surrounding said rotatable shaft between said interior flange and said compression plug.

2. The invention of claim 1 wherein compression plug further comprises a threaded cylindrical plug composed of material compatible with said body construction and retainably insertable by threading into the back end of said chamber.

* * * * *